United States Patent
Jain et al.

(10) Patent No.: US 10,306,562 B2
(45) Date of Patent: May 28, 2019

(54) TRANSPORT FORMAT COMBINATION SELECTION DURING SELF-JAMMING INTERFERENCE

(71) Applicant: QUALCOMM Incorporated, San Diego, CA (US)

(72) Inventors: Manish Jain, Santa Clara, CA (US); Omesh Kumar Handa, Carlsbad, CA (US); Anoop Ramakrishna, San Diego, CA (US); Vaishakh Rao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/927,360

(22) Filed: Oct. 29, 2015

(65) Prior Publication Data

US 2017/0127358 A1 May 4, 2017

(51) Int. Cl.
*H04W 52/22* (2009.01)
*H04W 52/26* (2009.01)
(Continued)

(52) U.S. Cl.
CPC ....... *H04W 52/243* (2013.01); *H04W 52/225* (2013.01); *H04W 52/26* (2013.01);
(Continued)

(58) Field of Classification Search
CPC ........... H03F 3/24; H04B 1/1027; H04B 1/12; H04B 1/126; H04B 1/30; H04B 1/40; H04B 1/4075; H04B 17/27; H03G 3/3042; H03G 3/3047; H04K 3/42; H04K 3/45; H04L 1/0003; H04L 1/0006; H04L 1/0013;
(Continued)

(56) References Cited

U.S. PATENT DOCUMENTS 6,747,958 B2   6/2004  Vayanos et al.
7,411,918 B2   8/2008  Zhang
(Continued)

FOREIGN PATENT DOCUMENTS

EP   2693815 A1   2/2014

OTHER PUBLICATIONS

International Search Report and Written Opinion—PCT/US2016/057997—ISA/EPO—dated Jan. 2, 2017.

*Primary Examiner* — Yuwen Pan
*Assistant Examiner* — Paul P Tran
(74) *Attorney, Agent, or Firm* — The Marbury Law Group, PLLC

(57) ABSTRACT

Embodiments include systems and methods for performing selection of a transport format combination by a device processor of a wireless communication device. The device processor may determine whether radio frequency self-jamming interference is detected at the receiver of the wireless communication device. The device processor may calculate an average transmit power reduction in response to determining that radio frequency self-jamming interference is detected at a receiver of the wireless communication device. The device processor may select a transport format combination based on the calculated average transmit power reduction, and may use the selected transport format combination to transmit data to a communication network.

24 Claims, 5 Drawing Sheets

(51) Int. Cl.
*H04W 52/36* (2009.01)
*H04W 52/24* (2009.01)
*H04W 52/14* (2009.01)
*H04W 88/06* (2009.01)

(52) U.S. Cl.
CPC ....... *H04W 52/365* (2013.01); *H04W 52/367* (2013.01); *H04W 52/146* (2013.01); *H04W 88/06* (2013.01)

(58) Field of Classification Search
CPC ....... H04L 1/0026; H04L 1/0069; H04L 1/00; H04L 27/2618; H04L 27/2624; H04L 1/1887; H04L 5/001; H04L 5/0032; H04L 5/0044; H04L 5/0064; H04L 5/14; H04W 48/04; H04W 52/24; H04W 52/243; H04W 52/365; H04W 52/50; H04W 88/06; H04W 24/00; H04W 24/02; H04W 48/02; H04W 52/0206; H04W 52/0235; H04W 52/06; H04W 52/26; H04W 52/281; H04W 52/286; H04W 52/346; H04W 52/0216; H04W 52/0277; H04W 48/146; H04W 48/225; H04W 48/24; H04W 48/243; H04W 48/26; H04W 48/365; H04W 48/367; H04W 48/50; H04W 52/04; H04W 52/146; H04W 52/225; H04W 52/367; H04W 56/00; H04W 72/0453; H04W 72/1215; H04W 72/1247; H04W 72/1257; H04W 72/1278; H04W 72/1284; H04W 74/0833; H04W 76/027; G01S 5/0226
See application file for complete search history.

(56) References Cited

U.S. PATENT DOCUMENTS

| | | | |
|---|---|---|---|
| 9,025,570 B2* | 5/2015 | Terry | H04W 52/223 370/335 |
| 2003/0112786 A1* | 6/2003 | Terry | H04W 52/223 370/342 |
| 2003/0193913 A1 | 10/2003 | Murata et al. | |
| 2007/0054625 A1* | 3/2007 | Beale | H04W 72/1231 455/69 |
| 2008/0159184 A1* | 7/2008 | Niwano | H04W 52/286 370/278 |
| 2010/0157895 A1* | 6/2010 | Pani | H04W 52/346 370/328 |
| 2010/0238832 A1* | 9/2010 | Gunnarsson | H04W 52/241 370/252 |
| 2012/0176923 A1* | 7/2012 | Hsu | H04W 52/243 370/252 |
| 2012/0184206 A1* | 7/2012 | Kim | H04L 5/0091 455/9 |
| 2012/0188889 A1* | 7/2012 | Sambhwani | H04B 7/0404 370/252 |
| 2012/0213139 A1* | 8/2012 | Zee | H04W 52/26 370/311 |
| 2013/0012135 A1* | 1/2013 | Ruohonen | H04B 1/406 455/63.1 |
| 2014/0071815 A1 | 3/2014 | Gu et al. | |
| 2014/0087663 A1* | 3/2014 | Burchill | H04W 52/287 455/41.2 |
| 2014/0169206 A1 | 6/2014 | Pelletier et al. | |
| 2014/0199993 A1 | 7/2014 | Dhanda et al. | |
| 2015/0181517 A1* | 6/2015 | Lee | H04W 52/0206 370/311 |
| 2016/0345315 A1* | 11/2016 | Noh | H04W 72/0406 |
| 2017/0064638 A1* | 3/2017 | Li | H04W 52/10 |
| 2018/0020467 A1* | 1/2018 | Nouah | H04L 1/1887 |

* cited by examiner

TRANSPORT FORMAT COMBINATION SELECTION DURING SELF-JAMMING INTERFERENCE

BACKGROUND

A wireless communication device may have two or more radio frequency (RF) communication circuits or "RF resource chains" that the wireless communication device may use for reception and transmission of RF signals. Some wireless communication device may include one or more subscriber identity modules (SIMs), which the wireless communication device may use to communicate with one or more cells of a wireless communication network. In some cases, each subscription on the wireless communication device may use an RF resource chain to communicate with its communication network.

The simultaneous use of two or more RF resource chains located in close proximity may cause one RF resource chain to interfere with or otherwise desensitize another RF resource chain, impacting the ability of the desensitized RF resource chain to receive a signal. In particular, transmission on one RF resource chain may interfere with reception by another nearby RF resource chain. Additionally, RF resource chains in a wireless communication device include non-linear analog components, such as power amplifiers and switches, which can radiate energy during transmission in frequencies (e.g., harmonics of the fundamental transmission frequency) that may interfere with reception of signals by the receiver components of a receiver. The undesired energy emissions of the transmitter may thus jam or desensitize a "victim" receiver, which may be referred to as "RF self-jamming interference."

To mitigate RF self-jamming interference, the wireless communication device can reduce the transmit power or the continuity of a transmitted waveform. However, compromising the transmit power or waveform can increase data transmission errors from the wireless communication device (e.g., increasing the block error rate (BLER) in the uplink). In response to an increase in transmission errors, a communication network may instruct the wireless communication device to increase data re-transmissions, which may consume more power of the wireless communication device. As uplink errors increase, the network may instruct the wireless communication device to increase its transmit power to keep the uplink error rate near a target value, which may further consume power of the wireless communication device as well as increase the level of self-jamming.

SUMMARY

Various embodiments include methods and wireless communication devices implementing methods for transport format combination (TFC) selection. Various methods may include determining whether a receiver of the wireless communication device will experience radio frequency self-jamming interference from uplink transmissions, calculating an average transmit power reduction in response to determining that the receiver of the wireless communication device will experiencing radio frequency self-jamming interference from uplink transmissions, and selecting a TFC for use in the uplink transmissions based on the calculated average transmit power reduction. In some embodiments, the calculated average transmit power reduction may include an average transmit power reduction per transmission time interval. In some embodiments, the calculated average transmit power reduction may include an average transmit power reduction over one or more basic processing groups in a transmission time interval. In some embodiments, the calculated average transmit power reduction may include an average power headroom based on a power headroom without a transmit power reduction and a weighted average of the transmit power reduction over one or more basic processing groups in a transmission time interval.

In some embodiments, calculating the average transmit power reduction may further include determining an amount of data to be transmitted from the wireless communication device to a communication network, and calculating the average transmit power reduction based on the amount of data to be transmitted from the wireless communication device to the communication network. In some embodiments, calculating the average transmit power reduction may further include determining a power transmit capability of the wireless communication device, and calculating the average transmit power reduction based on the determined power transmit capability of the wireless communication device.

In some embodiments, calculating the average transmit power reduction may further include determining an uplink transmission timing of a data transmission from the wireless communication device to a communication network, and calculating the average transmit power reduction based on the determined uplink transmission timing In some embodiments, calculating the average transmit power reduction may further include determining an amount of self-jamming interference, and calculating the average transmit power reduction based on the determined amount of self-jamming interference.

Some embodiments may further include determining a transmit power without reduction, determining a number of basic processing groups in a transmission time interval, and selecting one or more basic processing groups for transmit power reduction. Some embodiments may further include determining a transmit power reduction for the selected one or more basic processing groups. Some embodiments may further include identifying basic processing groups that are not selected for transmit power reduction. Some embodiments may further include transmitting data to a communication network using the selected transport format combination. Some embodiments may further include selecting a transport format combination in response to determining that the receiver of the wireless communication device will not experience radio frequency self-jamming interference from uplink transmissions, and transmitting data to a communication network using the selected transport format combination.

Further embodiments include a wireless communication device having two or more radio frequency (RF) resource chains, memory, and a processor configured with processor-executable instruction to perform operations of the methods described above. Further embodiments include a wireless communication device having means for performing functions of the methods described above. Further embodiments include non-transitory processor-readable media on which are stored processor-executable instructions configured to cause a processor of a wireless communication device to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
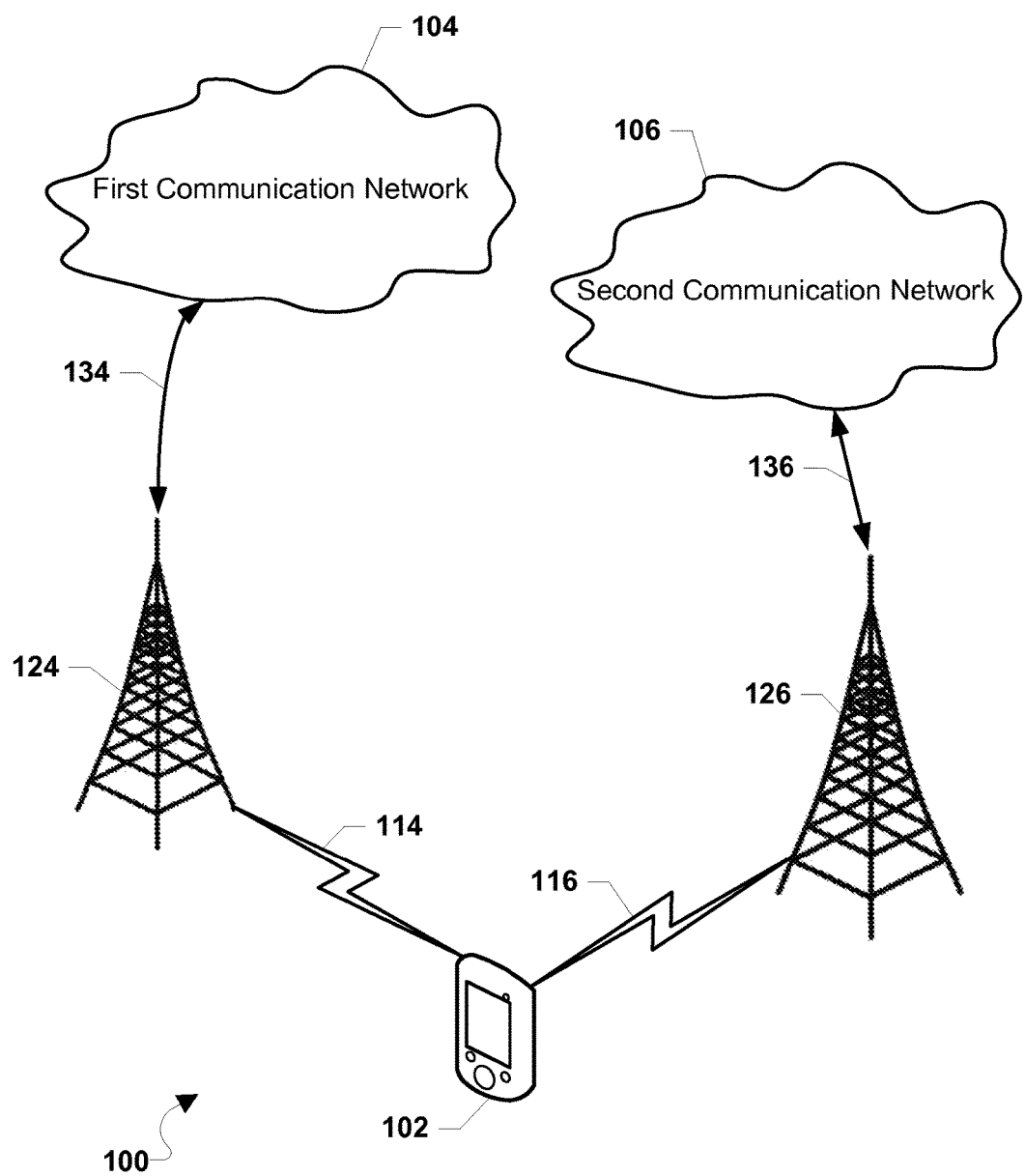
FIG. 1 is a communication system block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

Various embodiments provide methods for adaptively managing self-jamming interference by using transport format combination (TFC) selection based on a level of interference in a victim receiver and a desired signal in order to reduce interference while maintaining acceptable transmit performance by the wireless communication device.

The term "wireless communication device" is used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

The terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

A wireless communication device may include connectors for connecting to one or more SIM cards that enable the wireless communication device to access one or more communication networks (or one or more subscriber accounts on the same network). Each SIM card may serve to identify and authenticate a subscriber using a particular communication device, and each SIM card may be associated with a subscription. In various embodiments, the wireless communication device may also include a plurality of RF resource chains that may each be used for RF reception and transmission.

A wireless communication device may be capable of communicating over a variety of frequency bands, wireless communication systems (e.g., wide area network (WAN), Wireless Fidelity (Wi-Fi), or Near Field Communication (NFC)), and radio access technologies (RATs) within a WAN (e.g., 3GPP Long Term Evolution (LTE), Global System for Mobility (GSM), and Wideband Code Division Multiple Access (WCDMA)). To use different frequency systems and/or radio access technologies, a wireless communication device may include two or more radio transceivers. A wireless communication device may suffer from interference between two communications being accomplished simultaneously, such as when one RF resource chain transmits ("Tx") at the same time as another RF resource chain is attempting to receive ("Rx"). Radio transceivers in wireless communication devices include non-linear analog components, such as power amplifiers and switches. During transmission, non-linear components may generate energy in undesired frequencies (e.g., harmonics or subharmonics of the fundamental transmission frequency) that may interfere with the operation of components of a receiver. For example, the transmitter may radiate energy at frequencies above and below its operating frequency (i.e., sideband) in addition to at its operating frequency. This band spread may fall within the passband of a nearby or co-located receiver, even if the receiver's operating frequency is several megahertz (MHz) away. Thus, the transmitter noise may appear as an "on-channel" signal at the receiver, and as a result may not be filtered out at the receiver.

The undesired energy of the transmitter may thus jam and/or desensitize a "victim" receiver. As used herein, the terms "RF self-jamming interference," "interference," "RF interference," and "RF interference event" refer to an occasion in which one RF resource chain in a wireless communication device is attempting to transmit while another RF resource chain in the wireless communication device is attempting to receive a signal. As used herein, the term "victim" refers to the RF resource chain of the wireless communication device attempting to receive during an RF interference event. Additionally, the term "aggressor" refers to the RF resource chain of the wireless communication device that is attempting to transmit.

In various embodiments, transmitter noise (e.g., an aggressor's transmissions as well as RF emissions by transmitter components) may compete with a signal being received by a receiver (e.g., a victim's reception), which may degrade the operational performance of the receiver (i.e., may desense the victim's reception). For example, the victim may receive the aggressor's transmissions, which may cause interference and may degrade the victim's ability to receive desired signals. This interference may be in the form of blocking interference, harmonics, intermodulation distortion, power amplifier thermal noise, and other noises and distortion. Such interference may degrade the victim's receiver sensitivity, voice call quality, and data throughput. The interference may also cause higher rates for call drops and radio link failures and may cause the victim to lose a data connection.

To mitigate RF self-jamming interference, the wireless communication device may reduce a transmit power or a continuity of a transmitted waveform. For example, the wireless communication device may not transmit a signal for a duration (e.g., "blanking off" the transmitter), or the wireless communication device may decrease a limit of a maximum transmit power (e.g., a Maximum Transmit Power Limit). However, compromising the transmit power or waveform can increase data transmission errors from the wireless communication device, such as may be reflected in an increased BLER in the uplink, for example. In response to observing an increase in data transmission errors, a communication network may instruct the wireless communication device to increase data and/or packet re-transmissions, which typically consumes more power of the wireless communication device. As uplink errors increase further, the communication network may instruct the wireless communication device to increase its transmit power to keep the uplink error rate near a target value, which may further consume power of the wireless communication device, as well as increase the level of self-jamming interference.

Various embodiments provide wireless communication devices and methods that enable a processor of a wireless communication device to mitigate the effects of RF self-jamming interference by selecting a Transport Format Combination for data transmissions from the wireless communication device to the network in a manner that accounts for per-slot transmit power reduction.

A transport format (TF) defines characteristics of a transport channel, which may determine, for example, a data transfer rate and how data is coded by a physical layer. Multiple transport channels may be multiplexed onto one physical channel, but not all TFs from all channels can be multiplexed. A set of possible combinations of multiplexed TFs is referred to as a Transport Format Combination (TFC). In many cases, a wireless communication device may estimate a transmit power for each available TFC and select a TFC for data transmissions because the wireless communication device has the most accurate information about its buffer size (data amount to be transmitted), power transmit capabilities, and uplink transmission timing. The selected TFC may be identified to the network on a dedicated control channel, e.g., using an Enhanced Dedicated Channel Transport Format Combination Indication field (E-TFCI).

In various embodiments, the wireless communication device may detect RF self-jamming interference of a receiver of the wireless communication device, and may mitigate the RF self-jamming interference by reducing a transmission power (e.g., determining and applying a power back-off). The wireless communication device may then determine an amount of data to be transmitted to the communication network (e.g., an amount of data stored in a buffer, or "buffer size"). The wireless communication device may further calculate an average power headroom required to transmit the data in one or more TFCs.

In various embodiments, calculation of the average power headroom may include a calculation of the power reduction (referred to as "back-off") for one transmission time interval (TTI). The average power headroom calculation may also include a calculation of power reductions over one or more basic processing groups (bpgs) in the TTI. In some embodiments, the calculated average power headroom may include an average power reduction per TTI. In some embodiments, the calculated average power headroom may include an average power reduction per a number of basic processing groups in the TTI. In some embodiments, the average power headroom calculation may determine an average power headroom based on (1) a power headroom without the power reduction, and (2) a weighted average power reduction over the number of basic processing groups in a TTI.

In some embodiments, the wireless communication device may use the calculated average power headroom to select a TFC, thus accounting for the power reduction on a per-TTI basis (or a per-basic processing group basis). The selected TFC may provide superior uplink performance compared to a TFC selected using a power headroom calculated without accounting for the power reduction. The selected TFC may also provide superior uplink performance compared to a TFC selected using the power reduction without accounting for basic processing groups in which the power is not reduced. Thus, the wireless communication device may select a transport format combination that accounts for the deleterious effects of transmit power reduction on the transmitted signal when the wireless communication device performs transmit power reduction to mitigate self-jamming interference.

Various embodiments may be implemented in wireless communication devices that may operate within a variety of communication systems, particularly systems that include at least two communication networks. FIG. 1 illustrates a communication system 100 suitable for use with various embodiments. A wireless communication device 102 may communicate with a first communication network 104 and a second communication network 106. The first communication network 104 and the second communication network 106 may include a plurality of base stations (for example cellular base stations, e.g., a first base station 124 and a second base station 126).

The wireless communication device 102 may communicate with the first communication network 104 through a communication link 114 to the first base station 124, and the wireless communication device 102 may also communicate with the second communication network 106 through a communication link 116 to the second base station 126. The first base station 124 may communicate with the first communication network 104 over a wired or wireless communication link 134, which may include fiber optic backhaul links, microwave backhaul links, and other similar communication links. The second base station 126 may communicate with the second communication network 106 over a wired or wireless communication link 136 similar to the communication link 134. In some embodiments, the first and second communication networks may include mobile telephony communication networks.

While the communication links 114, 116 are illustrated as single links, each of the communication links 114, 116 may include a plurality of carrier signals, frequencies, or frequency bands, each of which may include a plurality of logical channels. Additionally, each of the communication links 114, 116 may utilize more than one radio access technology (RAT). For example, the wireless communication device 102 may receive a first carrier signal from the base station 124 and a second carrier signal from the base station 126. As another example, the wireless communication device 102 may receive the first carrier signal and the second carrier signal from the base station 124 or the base station 126.

In some embodiments, the communication links 114, 116 may include cellular communication links using a wireless communication protocol such as LTE, GSM, WCDMA, Worldwide Interoperability for Microwave Access (WiMAX), Code Division Multiple Access (CDMA), Time Division Multiple Access (TDMA), and other mobile telephony communication technologies. While the communication links 114, 116 are illustrated as single communication links, each of the communication links may include a plurality of frequencies or frequency bands, each of which may include a plurality of logical channels. Additionally, each of the communication links 114, 116 may utilize more than one radio access technology.

Figure 2:
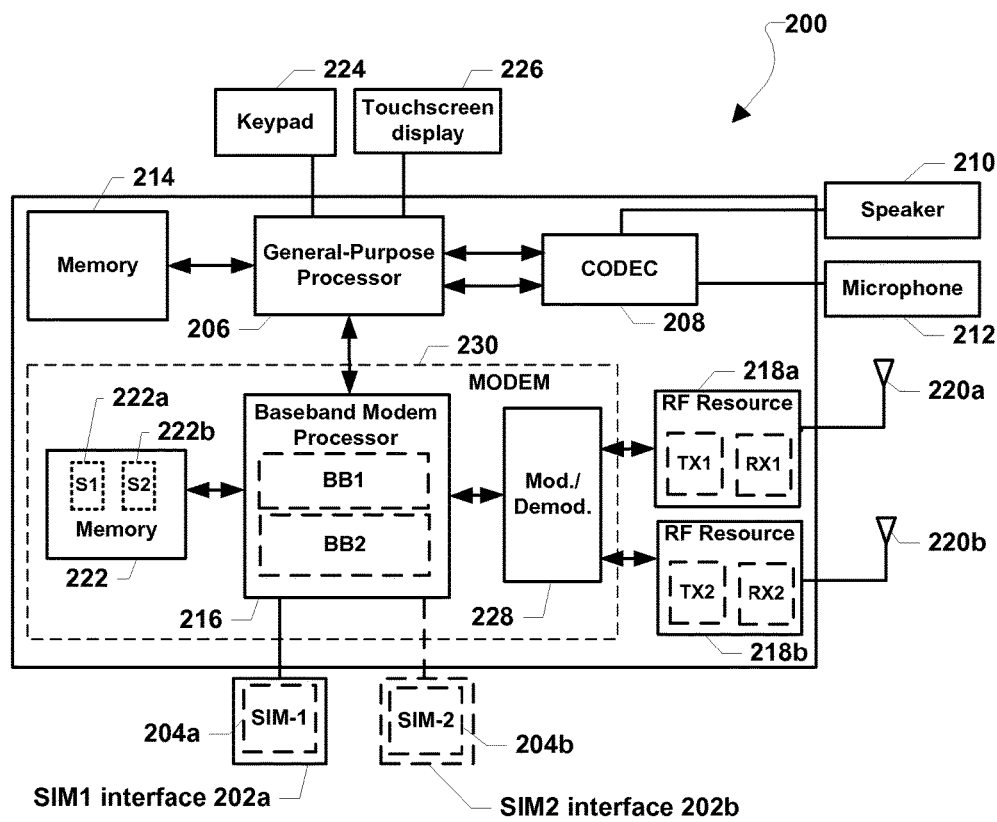
FIG. 2 is a block diagram illustrating a wireless communication device according to various embodiments.

FIG. 2 is a component block diagram of a wireless communication device 200 suitable for implementing various embodiments. With reference to FIGS. 1 and 2, in various embodiments, the wireless communication device 200 may be similar to the wireless communication device 102. The wireless communication device 200 may include a first subscriber identity module (SIM) interface 202*a*, which may receive a first identity module SIM-1 204*a* that is associated with a first subscription. The wireless communication device 200 may optionally also include a second SIM interface 202*b*, which may receive a second identity module SIM-2 204*b* that is associated with a second subscription.

A SIM in various embodiments may be a Universal Integrated Circuit Card (UICC) that is configured with SIM and/or USIM (Universal Subscriber Identity Module) applications, enabling access to, for example, GSM and/or Universal Mobile Telecommunications System (UMTS) networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM and I/O circuits. A SIM used in various embodiments may contain user account information, an international mobile subscriber identity (IMSI), a set of SIM application toolkit (SAT) commands and storage space for phone book contacts. A SIM card may further store a Home-Public-Land-Mobile-Network (HPLMN) code to indicate the SIM card network operator provider. An Integrated Circuit Card Identity (ICCID) SIM serial number may be printed on the SIM card for identification.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The memory 214 may be a non-transitory computer-readable storage medium that stores processor-executable instructions. For example, the instructions may include routing communication data relating to the first or second subscription through a corresponding baseband-RF resource chain. The memory 214 may store an operating system, as well as user application software and executable instructions. The memory 214 may also store application data, such as an array data structure.

The general-purpose processor 206 may be coupled to a modem 230. The modem 230 may include at least one baseband modem processor 216, which may be coupled to a memory 222 and a modulator/demodulator 228. The baseband modem processor 216 may include physically or logically separate baseband modem processors (e.g., BB1, BB2). The modulator/demodulator 228 may receive data from the baseband modem processor 216 and may modulate a carrier signal with encoded data and provide the modulated signal to an RF resource 218*a* for transmission. The modulator/demodulator 228 may also extract an information-bearing signal from a modulated carrier wave received from an RF resource 218*a*, and may provide the demodulated signal to the baseband modem processor 216. The modulator/demodulator 228 may be or include a digital signal processor (DSP).

The baseband modem processor 216 may read and write information to and from the memory 222. The memory 222 may also store instructions associated with a protocol stack, such as protocol stack S1 222*a* and protocol stack S2 222*b*. A protocol stack generally includes computer executable instructions to enable communication using a radio access protocol or communication protocol. Each protocol stack 222*a*, 222*b* typically includes network protocol layers structured hierarchically to provide networking capabilities. The modem 230 of a wireless communication device 200 may include one or more protocol stacks 222*a*, 222*b* to enable communication using one or more radio access technologies.

A protocol stack 222*a*, 222*b* may be associated with a SIM card 204*a*, 204*b* and/or a subscription. For example, the protocol stack S1 222*a* and the protocol stack S2 222*b* may be associated with the SIM-1 204*a*. The illustration of only two protocol stacks S1 and S2 is not intended as a limitation, and the memory 222 may store more than two protocol stacks (not illustrated). For example, the memory 222 may store a first plurality of protocol stacks, which may be associated with the SIM-1 204*a*, and a second plurality of protocol stacks, which may be associated with the SIM-2 204*b*. The wireless communication device 200 may include one or more protocol stacks associated with a subscription to enable communication with a communication network associated with the subscription using one or more radio access technologies.

Each SIM and/or RAT in the wireless communication device 200 (e.g., SIM-1 204*a* and SIM-2 204*b*) may be coupled to the modem 230 and may be associated with or permitted to use an RF resource chain. For example, a first RAT (e.g., a GSM RAT) may be associated with RF resource 218*a*, and a second RAT (e.g., a CDMA or WCDMA RAT) may be associated with RF resource 218*b*.

Each baseband-RF resource chain may include the baseband modem processor 216 to perform baseband/modem functions for communicating with/controlling a RAT, and one or more amplifiers and radios, referred to generally herein as RF resources. In some embodiments, baseband-RF resource chains may share a common baseband modem processor 216 (i.e., a single device that performs baseband/modem functions for all RATs on the wireless communication device). Alternatively, each baseband-RF resource chain may include the physically or logically separate baseband processors (e.g., BB1, BB2).

The RF resources 218*a*, 218*b* may be transceivers associated with one or more RATs and may perform transmit/receive functions for the wireless communication device 200 on behalf of their respective RATs. The RF resources 218*a*, 218*b* may include separate transmit and receive circuitry. The RF resources 218*a*, 218*b* may each be coupled to a wireless antenna (e.g., a first wireless antenna 220*a* and a second wireless antenna 220*b*). The RF resources 218*a*, 218*b* may also be coupled to the modem 230 (e.g., via the modulator/demodulator 228, or alternatively via the baseband modem processor 216 or another component). The term "RF resource chain" may include an RF resource (e.g., the RF resource 218*a*, 218*b*), an antenna (e.g., the antennas 220*a*, 220*b*), and one or more components of the modem 230.

In some embodiments, the general-purpose processor 206, memory 214, baseband processor(s) 216, and RF resources 218*a*, 218*b* may be included in the wireless communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in the wireless communication device 200 to enable communication between them.

Functioning together, the two SIMs 204a, 204b, baseband processor BB1, BB2, RF resources 218a, 218b, and antennas 220a, 220b may constitute two or more RATs. For example, one SIM, baseband processor, and RF resource may be configured to support two different radio access technologies. In other embodiments, more RATs may be supported on the wireless communication device 200 by adding more SIM cards, SIM interfaces, RF resources, and antennae for connecting to additional mobile networks.

Figure 3:
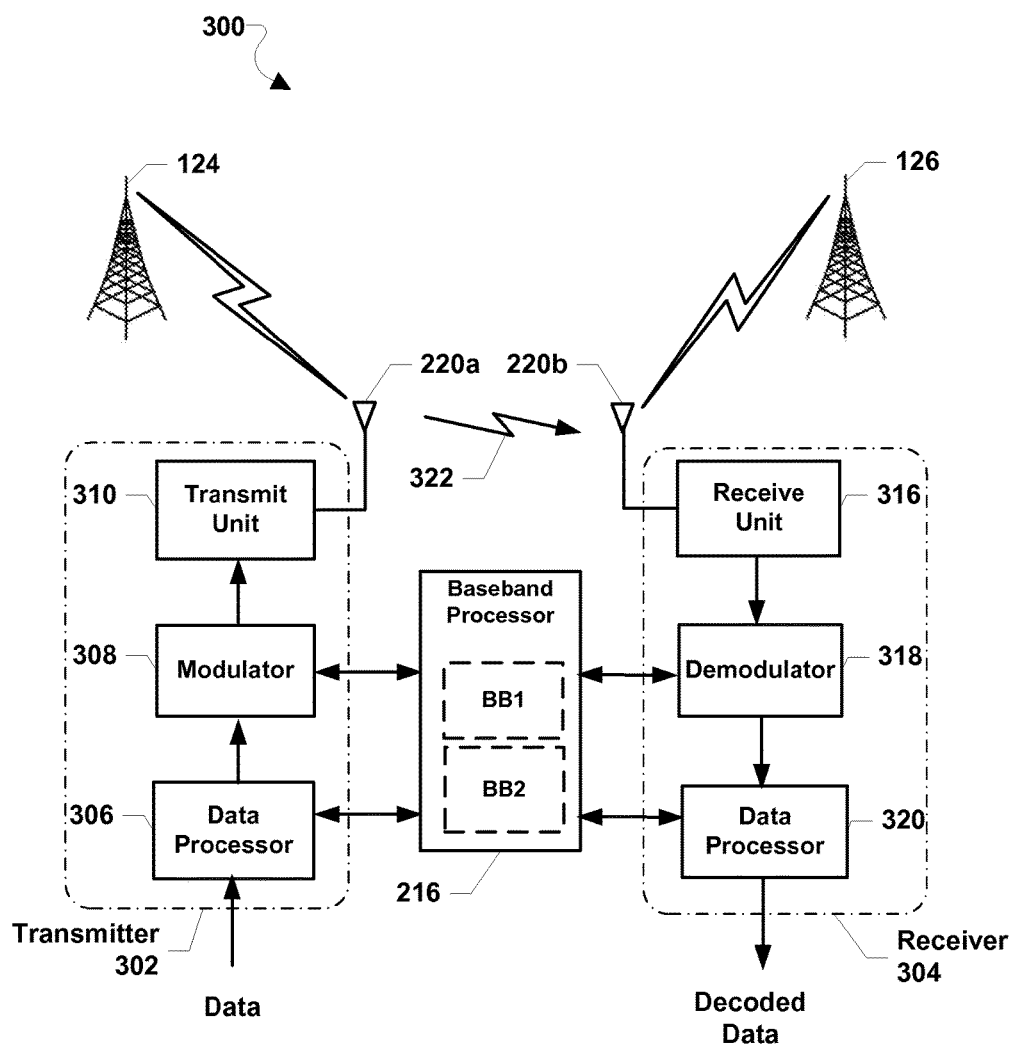
FIG. 3 is a block diagram illustrating transmit and receive components in separate RF resource chains in a wireless communication device according to various embodiments.

FIG. 3 illustrates a block diagram 300 of transmit and receive components in separate RF resources suitable for implementing various embodiments. With reference to FIGS. 1-3, in various embodiments, the transmit and receive components may be implemented in a wireless communication device similar to one or more of the wireless communication devices 102, 200.

One RF resource (e.g., the RF resource 218a) may include a transmitter 302, and another RF resource (e.g., the RF resource 218b) may include a receiver 304. In a particular embodiment, the transmitter 302 may include a data processor 306 that may format, encode, and interleave data to be transmitted. The transmitter 302 may include a modulator 308 that modulates a carrier signal with encoded data; for example, by performing Gaussian minimum shift keying (GMSK). One or more transmit units 310 (e.g., transmit circuitry) may condition the modulated signal (e.g., by filtering, amplifying, and upconverting) to generate a RF modulated signal for transmission, e.g., to the base station 124 via the antenna 220a.

At the receiver 304, the antenna 220b may receive RF modulated signals, such as from the base station 126. One or more receive units 316 (e.g., receive circuitry) may condition (e.g., filter, amplify, and downconvert) the received RF modulated signal, digitize the conditioned signal, and provide samples to a demodulator 318. The demodulator 318 may extract the original information-bearing signal from the modulated carrier wave, and may provide the demodulated signal to a data processor 320. The data processor 320 may de-interleave and decode the received signal to obtain the original, decoded data, and may provide decoded data to other components in the wireless communication device. Operations of the transmitter and the receiver may be controlled by a processor, such as the baseband processor(s) 216. In various embodiments, each of the transmitter 302 and receiver 304 may be implemented as circuitry that may be separated from their corresponding receive and transmit circuitries (not shown). Alternatively, the transmitter 302 and the receiver 304 may be respectively combined with corresponding receive circuitry and transmit circuitry (e.g., as transceivers associated with SIM-1 and SIM-2, for example, the RF resources 218a and 218b).

The antenna 220b may also receive some RF signals 322 emitted from the transmitter 302, which may compete with a desired signal from the base station 126. Receiver desense may occur when a signal transmitted on an uplink from the transmitter 302 interferes with receive activity on the receiver 304. Desired signals may become corrupted and difficult or impossible to decode.

Figure 4:
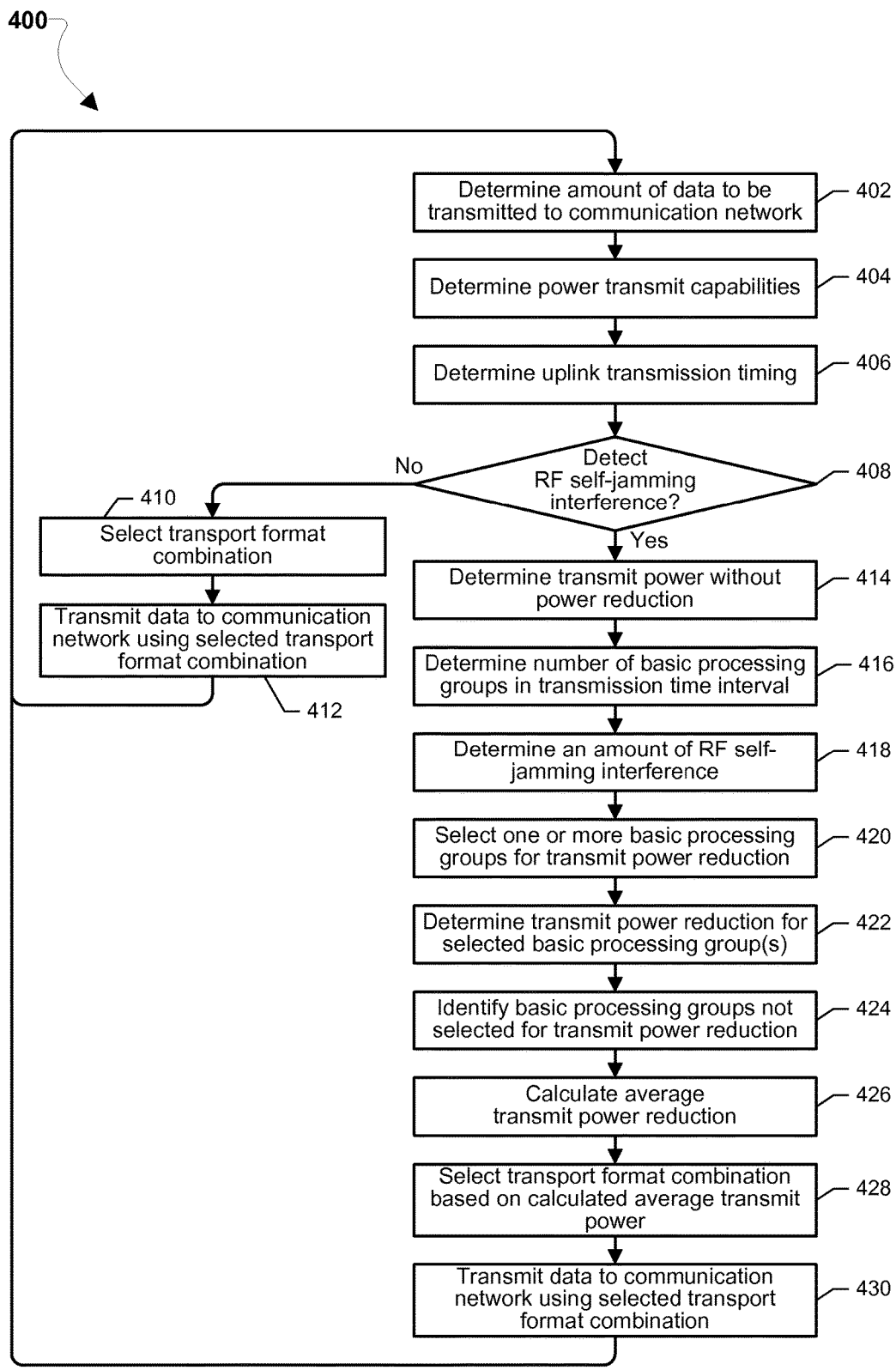
FIG. 4 is a process flow diagram illustrating a method for performing transport format combination selection according to various embodiments.

FIG. 4 is a process flow diagram illustrating a method 400 for performing transport format combination selection a wireless communication device for purposes of managing self-jamming interference according to some embodiments. With reference to FIGS. 1-4, the method 400 may be implemented by a processor (e.g., the general-purpose processor 206, the baseband modem processor 216, a separate controller, and/or the like) of a wireless communication device (e.g., the wireless communication devices 102, 200).

In block 402, the processor of the wireless communication device (a "device processor") may determine an amount of data to be transmitted to a communication network. For example, the device processor may determine an amount of data in a buffer or other memory (e.g., a buffer size) to be transmitted from the wireless communication device to the communication network.

In block 404, the device processor may determine power transmit capabilities of the wireless communication device. In some embodiments, the power transmit capabilities may include a maximum power transmission capability of the transmitter of the wireless communication device, one or more power transmit parameters set by the communication network and/or the wireless communication device, and/or an amount of power stored in the wireless communication device (e.g., battery storage level).

In block 406, the device processor may determine an uplink transmission timing for an upcoming uplink transmission to the communication network. In some embodiments, the uplink transmission timing may be dictated by a RAT to be used for the uplink transmission and/or an instruction from the communication network.

In determination block 408, the device processor may determine whether a receiver is or will experience RF self-jamming interference from the upcoming uplink transmissions. This determination may include determining whether uplink transmissions will coincide with scheduled downlink reception events, frequencies and transmit power of the uplink transmissions, frequencies and link characteristics of the downlink, and other factors. RF self-jamming interference may also be detected by monitoring the receive channel for increased bit rate errors.

In response to determining that RF self-jamming interference is detected (i.e., determination block 408="Yes"), the device processor may determine a transmit power without any power reduction in block 414.

In block 416, the device processor may determine a number of basic processing groups (bpgs) in a transmission time interval (TTI). The TTI typically represents the duration of a transmission of data over a wireless communication link, and may be related to the size of the data box passed from a higher network layer to a radio link layer. A basic processing group typically represents a subdivision of the TTI in which, among other things, the device processor may perform a power reduction operation. The number of basic processing groups in the TTI may be determined based on the RAT, one or more communication timing parameters dictated by the communication network, and/or other factors.

In block 418, the device processor may determine an amount of RF self-jamming interference. For example, the device processor may determine a level of interference caused by the aggressor transmitter on the victim receiver. In some embodiments, the device processor may also determine a timing of the RF self-jamming interference. For example, the amount of RF self-jamming interference may vary over time, such that the victim receiver does not experience a constant level of interference. In some embodiments, the amount of RF self-jamming interference may vary during the TTI.

In block 420, the device processor may select one or more basic processing groups for transmit power reduction. In some embodiments, the device processor may select one or more basic processing groups for power reduction based on the presence of the detected RF self-jamming interference. In some embodiments, the device processor may select the one or more basic processing groups based on the level of the RF self-jamming interference and/or the timing of the detected RF self-jamming interference (e.g., the timing of the RF self-jamming interference during the TTI).

In block 422, the device processor may determine a transmit power reduction for the selected one or more basic processing groups. For example, the device processor may determine a reduced transmit power level for the selected one or basic processing groups. The device processor may determine the reduced transmit power level based on the interference level and/or the timing of the detected RF self-jamming interference. In some embodiments, the reduced transmit power level may vary for one or more of the selected basic processing groups.

In block 424, the device processor may identify basic processing groups that are not selected for transmit power reduction.

In block 426, the device processor may calculate an average transmit power reduction. In some embodiments, the average transmit power reduction may be calculated for a transmission time interval (e.g., an average transmit power reduction per transmission time interval.) In some embodiments, the average transmit power reduction may be calculated over one or more basic processing groups in a transmission time interval. In some embodiments, the average transmit power reduction may be calculated as an average power headroom based on a power headroom without a transmit power reduction and a weighted average of the transmit power reduction over one or more basic processing groups in a transmission time interval.

The device processor may determine an amount of power reduction to mitigate the detected RF self-jamming interference based on a variety of factors. For example, the device processor may determine the amount of power reduction, and thus may determine the average transmit power reduction, based on the determined power transmit capability of the wireless communication device. As another example, the device processor may determine the amount of power reduction (and thus the average transmit power reduction) based on the determined uplink transmission timing. As another example, the device processor may determine the amount of power reduction (and thus the average transmit power reduction) based on the determined amount of self-jamming interference (e.g., the interference level).

In some embodiments, the device processor may determine the average transmit power reduction as an average transmit power headroom, which may be represented as $H_{average}$. In various embodiments, may be determined according to the following equation:

$$H_{average} = H_{no\_reduction} \times \frac{(N_{normal}) + (P_{reduction} \times N_{reduction})}{N_{TTI}}$$

in which $H_{no\_reduction}$ represents a power headroom (e.g., a transmit power) that is computed without any power reduction in a TTI, $P_{reduction}$ represents an amount of transmit power reduction, $N_{reduction}$ represents a number of basic processing groups in the TTI in which the transmit power is reduced, and $N_{TTI}$ represents the number of basic processing groups in the TTI. According to this equation, $H_{average}$ includes a weighted average of the transmit power reduction over one or more basic processing groups in the TTI. Thus, $H_{average}$ may represent an average power headroom based on a power headroom without a transmit power reduction and a weighted average of the transmit power reduction over one or more basic processing groups in a transmission time interval.

In block 428, the device processor may select a TFC based on the calculated average transmit power and communicate the selection to the communication network. In some embodiments, the device processor may send a message to the communication network indicating the selected TFC. In some embodiments, the device processor may identify the selected TFC to the communication network over a dedicated control channel (DCH). In some embodiments, the message may include an Enhanced Dedicated Channel Transport Format Combination Indication (E-TFCI) field.

In block 430, the device processor may transmit some or all of the data awaiting transmission to the communication network using the selected TFC.

Returning to determination block 408, in response to determining that RF self-jamming interference is not detected (i.e., determination block 408="No"), the device processor may select a transport format combination in block 410 based on factors other than average transmit power reduction. In other words, when RF self-jamming interference is not an issue, the transport format combination may be selected conventional or standard criteria other than the calculated average transmit power. The device processor may transmit some or all of the data awaiting transmission to the communication network using the selected transport format combination in block 412.

A TFC selected according to various embodiments may provide superior uplink performance compared to a TFC selected using a power headroom calculated without accounting for the power reduction. The selected TFC may also provide superior uplink performance compared to a TFC selected using the power reduction without accounting for basic processing groups in which the power is not reduced. Thus, the wireless communication device may select a TFC that accounts for the deleterious effects of transmit power reduction on transmitted signal when the wireless communication device performs transmit power reduction to mitigate self-jamming interference.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

Figure 5:
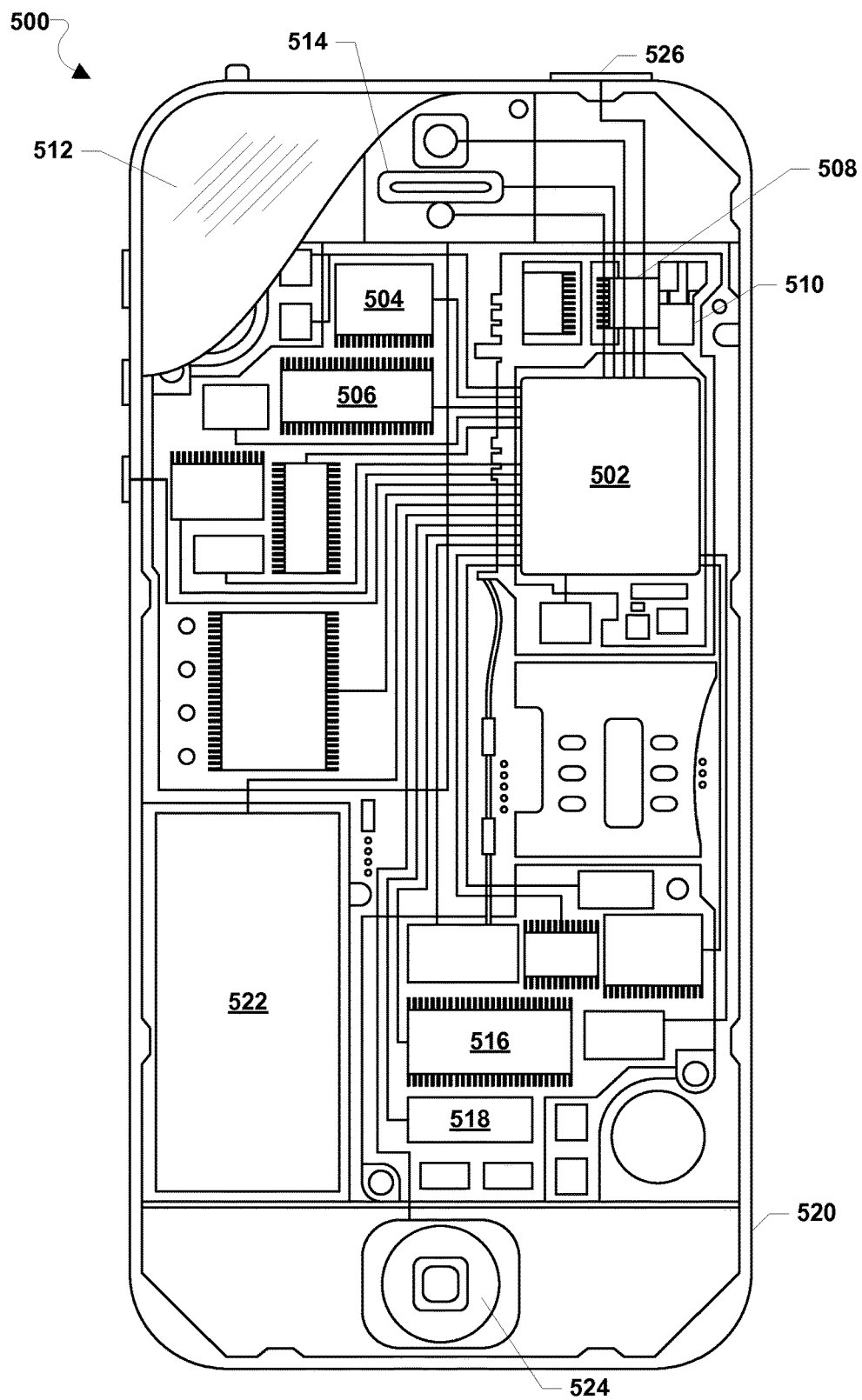
FIG. 5 is a component diagram of an example wireless communication device suitable for use with the various aspects.

Various embodiments (including, but not limited to, embodiments discussed above with reference to FIGS. 1-4) may be implemented in any of a variety of wireless communication devices, an example of which (e.g., wireless communication device 500) is illustrated in FIG. 5. With reference to FIGS. 1-5, in various embodiments, the wireless communication device 500 (which may correspond, for example, to the wireless communication devices 102 and 200) may include a processor 502 coupled to a touchscreen controller 504 and an internal memory 506. The processor 502 may be one or more multi-core integrated circuits designated for general or specific processing tasks. The internal memory 506 may be volatile or non-volatile memory, and may also be secure and/or encrypted memory, or unsecure and/or unencrypted memory, or any combination thereof. The touchscreen controller 504 and the processor 502 may also be coupled to a touchscreen panel 512, such as a resistive-sensing touchscreen, capacitive-sensing touchscreen, infrared sensing touchscreen, etc. Additionally, the display of the wireless communication device 500 need not have touch screen capability.

The wireless communication device 500 may have two or more radio signal transceivers 508 (e.g., Peanut, Bluetooth, ZigBee, Wi-Fi, RF radio) and antennae 510, for sending and receiving communications, coupled to each other and/or to the processor 502. The transceivers 508 and antennae 510 may be used with the above-mentioned circuitry to implement the various wireless transmission protocol stacks and interfaces. The wireless communication device 500 may include one or more cellular network wireless modem chip(s) 516 coupled to the processor and antennae 510 that enable communication via two or more cellular networks via two or more radio access technologies.

The wireless communication device 500 may include a peripheral device connection interface 518 coupled to the processor 502. The peripheral device connection interface 516 may be singularly configured to accept one type of connection, or may be configured to accept various types of physical and communication connections, common or proprietary, such as USB, FireWire, Thunderbolt, or PCIe. The peripheral device connection interface 516 may also be coupled to a similarly configured peripheral device connection port (not shown).

The wireless communication device 500 may also include speakers 514 for providing audio outputs. The wireless communication device 500 may also include a housing 520, constructed of a plastic, metal, or a combination of materials, for containing all or some of the components discussed herein. The wireless communication device 500 may include a power source 522 coupled to the processor 502, such as a disposable or rechargeable battery. The rechargeable battery may also be coupled to the peripheral device connection port to receive a charging current from a source external to the wireless communication device 500. The wireless communication device 500 may also include a physical button 524 for receiving user inputs. The wireless communication device 500 may also include a power button 526 for turning the wireless communication device 500 on and off.

The processor 502 may be any programmable microprocessor, microcomputer or multiple processor chip or chips that can be configured by software instructions (applications) to perform a variety of functions, including the functions of various embodiments described below. In some wireless communication devices, multiple processors 502 may be provided, such as one processor dedicated to wireless communication functions and one processor dedicated to running other applications. Typically, software applications may be stored in the internal memory 506 before they are accessed and loaded into the processor 502. The processor 502 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavyweight process that includes multiple lightweight processes or threads, which are processes that share all or portions of their context (e.g., address space, stack, permissions, and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, various embodiments are not intended to be limited to the embodiments shown herein but are to be accorded the widest scope consistent with the following claims and the principles and novel features disclosed herein.

What is claimed is:

1. A method of transport format combination selection performed by a processor of a wireless communication device, comprising:
   determining whether an upcoming uplink transmission from a transmitter of the wireless communication device will coincide with a scheduled downlink reception event of a receiver of the wireless communication device;
   determining whether the receiver will experience radio frequency self-jamming interference during the scheduled downlink reception event from the upcoming uplink transmission based on a frequency and transmit power associated with the upcoming uplink transmission and a frequency and link characteristic associated with the scheduled downlink reception event;
   calculating an average transmit power reduction over one or more basic processing groups in a transmission time interval in response to determining that the receiver will experience radio frequency self-jamming interference during the scheduled downlink reception event from the upcoming uplink transmission based on the frequency and transmit power associated with the upcoming uplink transmission and the frequency and link characteristic associated with the scheduled downlink reception event, wherein the one or more basic processing groups have varying amounts of transmit power reduction; and
   selecting a transport format combination for use in the upcoming uplink transmission based on the calculated average transmit power reduction.

2. The method of claim 1, wherein calculating the average transmit power reduction over the one or more basic processing groups in the transmission time interval in response to determining that the receiver will experience radio frequency self-jamming interference during the scheduled downlink reception event from the upcoming uplink transmission based on the frequency and transmit power associated with the upcoming uplink transmission and the frequency and link characteristic associated with the scheduled downlink reception event further comprises calculating an average power headroom based on:
   a power headroom without a transmit power reduction; and
   a weighted average of the transmit power reduction over the one or more basic processing groups in the transmission time interval.

3. The method of claim 1, wherein calculating the average transmit power reduction over the one or more basic processing groups in the transmission time interval in response to determining that the receiver will experience radio frequency self-jamming interference during the scheduled downlink reception event from the upcoming uplink transmission based on the frequency and transmit power associated with the upcoming uplink transmission and the frequency and link characteristic associated with the scheduled downlink reception event further comprises:
   determining an amount of data to be transmitted from the wireless communication device to a communication network; and
   calculating the average transmit power reduction based on the amount of data to be transmitted from the wireless communication device to the communication network.

4. The method of claim 1, wherein calculating the average transmit power reduction over the one or more basic processing groups in the transmission time interval in response to determining that the receiver will experience radio frequency self-jamming interference during the scheduled downlink reception event from the upcoming uplink transmission based on the frequency and transmit power associated with the upcoming uplink transmission and the frequency and link characteristic associated with the scheduled downlink reception event further comprises:
   determining a power transmit capability of the wireless communication device; and
   calculating the average transmit power reduction based on the determined power transmit capability of the wireless communication device.

5. The method of claim 1, wherein calculating the average transmit power reduction over the one or more basic processing groups in the transmission time interval in response to determining that the receiver will experience radio frequency self-jamming interference during the scheduled downlink reception event from the upcoming uplink transmission based on the frequency and transmit power associated with the upcoming uplink transmission and the frequency and link characteristic associated with the scheduled downlink reception event further comprises:
determining an uplink transmission timing of a data transmission from the wireless communication device to a communication network; and
calculating the average transmit power reduction based on the determined uplink transmission timing.

6. The method of claim 1, wherein calculating the average transmit power reduction over the one or more basic processing groups in the transmission time interval in response to determining that the receiver will experience radio frequency self-jamming interference during the scheduled downlink reception event from the upcoming uplink transmission based on the frequency and transmit power associated with the upcoming uplink transmission and the frequency and link characteristic associated with the scheduled downlink reception event further comprises:
determining an amount of self-jamming interference; and
calculating the average transmit power reduction based on the determined amount of self-jamming interference.

7. The method of claim 1, further comprising:
determining a transmit power without reduction;
determining a number of basic processing groups in the transmission time interval; and
selecting the one or more basic processing groups for transmit power reduction.

8. The method of claim 7, further comprising:
determining a transmit power reduction for the selected one or more basic processing groups.

9. The method of claim 7, further comprising:
identifying basic processing groups that are not selected for transmit power reduction.

10. The method of claim 1, further comprising:
transmitting data to a communication network using the selected transport format combination.

11. The method of claim 1, further comprising:
selecting the transport format combination based on factors other than the average transmit power reduction in response to determining that the receiver will not experience radio frequency self-jamming interference during the scheduled downlink reception event from the upcoming uplink transmission; and
transmitting data to a communication network using the selected transport format combination.

12. A wireless communication device, comprising:
a memory;
a transmitter;
a receiver; and
a processor coupled to the memory, the transmitter, and the receiver and configured with processor-executable instructions to:
determine whether an upcoming uplink transmission from the transmitter will coincide with a scheduled downlink reception event of the receiver;
determine whether the receiver will experience radio frequency self-jamming interference during the scheduled downlink reception event from the upcoming uplink transmission based on a frequency and transmit power associated with the upcoming uplink transmission and a frequency and link characteristic associated with the scheduled downlink reception event;
calculate an average transmit power reduction over one or more basic processing groups in a transmission time interval in response to determining that the receiver will experience radio frequency self-jamming interference during the scheduled downlink reception event from the upcoming uplink transmission based on the frequency and transmit power associated with the upcoming uplink transmission and the frequency and link characteristic associated with the scheduled downlink reception event, wherein the one or more basic processing groups have varying amounts of transmit power reduction; and
select a transport format combination for use in the upcoming uplink transmission based on the calculated average transmit power reduction.

13. The wireless communication device of claim 12, wherein the processor is further configured with processor-executable instructions to calculate the average transmit power reduction by calculating an average power headroom based on:
a power headroom without a transmit power reduction; and
a weighted average of the transmit power reduction over the one or more basic processing groups in the transmission time interval.

14. The wireless communication device of claim 12, wherein the processor is further configured with processor-executable instructions to:
determine an amount of data to be transmitted from the wireless communication device to a communication network; and
calculate the average transmit power reduction based on the amount of data to be transmitted from the wireless communication device to the communication network.

15. The wireless communication device of claim 12, wherein the processor is further configured with processor-executable instructions to:
determine a power transmit capability of the wireless communication device; and
calculate the average transmit power reduction based on the determined power transmit capability of the wireless communication device.

16. The wireless communication device of claim 12, wherein the processor is further configured with processor-executable instructions to:
determine an uplink transmission timing of a data transmission from the wireless communication device to a communication network; and
calculate the average transmit power reduction based on the determined uplink transmission timing.

17. The wireless communication device of claim 12, wherein the processor is further configured with processor-executable instructions to:
determine an amount of self-jamming interference; and
calculate the average transmit power reduction based on the determined amount of self-jamming interference.

18. The wireless communication device of claim 12, wherein the processor is further configured with processor-executable instructions to:
determine a transmit power without reduction;
determine a number of basic processing groups in the transmission time interval; and select the one or more basic processing groups for transmit power reduction.

19. The wireless communication device of claim 18, wherein the processor is further configured with processor-executable instructions to:
determine a transmit power reduction for the selected one or more basic processing groups.

20. The wireless communication device of claim 18, wherein the processor is further configured with processor-executable instructions to:
identify basic processing groups that are not selected for transmit power reduction.

21. The wireless communication device of claim 12, wherein the processor is further configured with processor-executable instructions to:
transmit data to a communication network using the selected transport format combination.

22. The wireless communication device of claim 12, wherein the processor is further configured with processor-executable instructions to:
select the transport format combination based on factors other than the average transmit power reduction in response to determining that the receiver will not experience radio frequency self-jamming interference during the scheduled downlink reception event from the upcoming uplink transmission; and
transmit data to a communication network using the selected transport format combination.

23. A wireless communication device, comprising:
a transmitter;
a receiver;
means for determining whether an upcoming uplink transmission from the transmitter will coincide with a scheduled downlink reception event of the receiver;
means for determining whether the receiver will experience radio frequency self-jamming interference during the scheduled downlink reception event from the upcoming uplink transmission based on a frequency and transmit power associated with the upcoming uplink transmission and a frequency and link characteristic associated with the scheduled downlink reception event;
means for calculating an average transmit power reduction over one or more basic processing groups in a transmission time interval in response to determining that the receiver will experience radio frequency self-jamming interference during the scheduled downlink reception event from the upcoming uplink transmission based on the frequency and transmit power associated with the upcoming uplink transmission and the frequency and link characteristic associated with the scheduled downlink reception event, wherein the one or more basic processing groups have varying amounts of transmit power reduction; and
means for selecting a transport format combination for use in the upcoming uplink transmission based on the calculated average transmit power reduction.

24. A non-transitory processor-readable storage medium having stored thereon processor-executable instructions configured to cause a processor of a wireless communication device to perform operations comprising:
determining whether an upcoming uplink transmission from a transmitter of the wireless communication device will coincide with a scheduled downlink reception event of a receiver of the wireless communication device;
determining whether the receiver will experience radio frequency self-jamming interference during the scheduled downlink reception event from the upcoming uplink transmission based on a frequency and transmit power associated with the upcoming uplink transmission and a frequency and link characteristic associated with the scheduled downlink reception event;
calculating an average transmit power reduction over one or more basic processing groups in a transmission time interval in response to determining that the receiver will experience radio frequency self-jamming interference during the scheduled downlink reception event from the upcoming uplink transmission based on the frequency and transmit power associated with the upcoming uplink transmission and the frequency and link characteristic associated with the scheduled downlink reception event, wherein the one or more basic processing groups have varying amounts of transmit power reduction; and
selecting a transport format combination for use in the upcoming uplink transmission based on the calculated average transmit power reduction.

\* \* \* \* \*